United States Patent [19]
Jantsch et al.

[11] Patent Number: 5,582,624
[45] Date of Patent: Dec. 10, 1996

[54] PROCESS FOR PRODUCING MOLTEN-CARBONATE FUEL CELLS

[75] Inventors: Uwe Jantsch, Dornstadt; Hermann Koch, Stuttgart; Bernd Rohland, Ulm; Frank U. Weilberg, Eberdingen; Hartmut Wendt, Dieburg, all of Germany

[73] Assignee: MTU Motoren-und Turbine-Union Friedrichshafen GmbH, Germany

[21] Appl. No.: 495,636

[22] PCT Filed: Jan. 29, 1994

[86] PCT No.: PCT/EP94/00253

§ 371 Date: Sep. 20, 1995

§ 102(e) Date: Sep. 20, 1995

[87] PCT Pub. No.: WO94/18713

PCT Pub. Date: Aug. 18, 1994

[30] Foreign Application Priority Data

Feb. 4, 1993 [DE] Germany ............ 433 03 163.6

[51] Int. Cl.⁶ .................. H01M 4/88; H01M 8/14
[52] U.S. Cl. .......... 29/623.1; 29/623.5; 429/16; 429/41
[58] Field of Search ............... 29/623.5, 623.1; 429/16, 41, 44, 46

[56] References Cited

U.S. PATENT DOCUMENTS

| | | | |
|---|---|---|---|
| 4,247,604 | 1/1981 | Marianowski et al. | 429/40 |
| 4,404,267 | 9/1983 | Jacovangelo et al. | 429/41 |
| 4,554,225 | 11/1985 | Sounai et al. | 429/34 |
| 4,721,513 | 1/1988 | Smith et al. | 29/623.5 |
| 5,021,303 | 6/1991 | Donado | 429/16 |
| 5,206,095 | 4/1993 | Donado et al. | 429/16 |

*Primary Examiner*—Anthony Skapars
*Attorney, Agent, or Firm*—Evenson, McKeown, Edwards & Lenahan P.L.L.C.

[57] ABSTRACT

The invention provides a process for producing the cathode layer of a molten-carbonate fuel cell in which the cathode layer is present in a layer arrangement with a matrix layer and an anode layer. A porous cobalt or iron layer is filled with lithium carbonate, the cobalt or iron layer is oxidized at a temperature below the melting point of the lithium carbonate in an oxidizing atmosphere to form a cobalt oxide or iron oxide layer, and subsequently, after the temperature is increased above the melting point of the lithium carbonate, the cobalt oxide or iron oxide is reacted with the molten lithium carbonate to form lithium cobaltite or lithium ferrite.

19 Claims, 1 Drawing Sheet

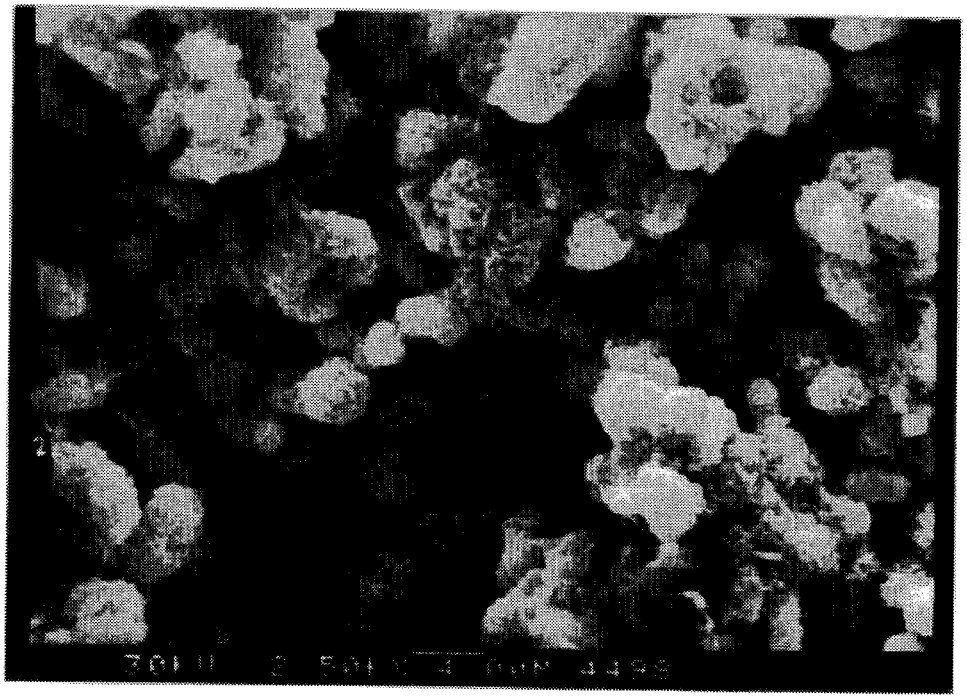

PROCESS FOR PRODUCING MOLTEN-CARBONATE FUEL CELLS

The invention relates to a process for producing a molten-carbonate fuel cell according to the preamble of claim 1.

Molten carbonate fuel cells (MCFC) of this type are known. By means of a direct electrochemical approach, they permit the obtaining of electric energy with an efficiency of more than 50% from the reaction of a high-hydrogen burnable gas with oxygen. The electric collectible energy may be obtained between the anode layer and the cathode layer as direct current or direct voltage. A molten mixture of lithium carbonate and potassium carbonate or sodium carbonate and other admixtures is used as the electrolyte. The molten electrolyte is held in the fine-pored matrix layer which usually consists of lithium aluminate and separates the gas chambers of the anode (burnable gas) and of the cathode (air) from one another. The molten carbonate fuel cell operates at temperatures of between 550° and 750° C. It may be operated atmospherically but also by means of several hundred kPa above the atmospheric pressure.

A gas mixture, which contains oxygen and carbon dioxide, is fed to the cathode layer. The oxygen is reduced on the cathode layer and, together with the carbon dioxide, forms carbonations which are absorbed by the electrolyte. On the anode layer, the hydrogen from the burnable gas with the carbonations of the electrolyte melting are oxidized to form carbon dioxide and water. The carbon dioxide formed on the anode layer may be returned to the cathode gas. Hydrogen-rich gases, such as natural gas, may also be used as the burnable gas in the molten-carbonate fuel cell. By means of a catalyst and with the addition of heat—in which case the heat is utilized which is released in the fuel cell operation—, the gases are reformed to form a hydrogen-rich burnable gas which is converted on the anode layer of the fuel cell.

Currently, molten-carbonate fuel cells are usually produced in that at first a layer arrangement consisting of a porous nickel anode layer, a porous lithium aluminate matrix layer and a porous nickel cathode layer is deposited between the current collector plates of the cell and is adjusted. Generally, a metallic current transmission plate, as a bipolar plate, is also applied to each of the two current collector plates of the fuel cell. Several of such fuel cells are arranged in a stack in a cell holder. The matrix layer protrudes over the electrode layers, thus over the cathode and the anode layer. The protruding edge of the matrix layer is pressed in between the edges of the bipolar plates of the fuel cell stack, whereby the sealing of the electrode spaces and the electric series connection of the cells is caused in the interior of a fuel cell stack. In the case of the burnable gas and the supplying of air with an external distribution on the electrode spaces between the bipolar plate and the adjacent electrode layer—so-called external gas distribution ("manifolding")—the porous electrode layers will contain the molten electrolyte in their pores during the start, while, in the case of the internal gas distribution, the molten electrolyte is placed as a lithium potassium carbonate foil on the electrode layers into the layer arrangement so that the molten electrolyte is not taken in by the matrix layer before the starting procedure of the fuel cell.

In the case of a molten-carbonate fuel cell, the external and internal gas distribution basically differ from one another in that, in the case of the external gas distribution, no shrinkage of the cell stack can be accepted when the heating is started because otherwise the external gas sealing of the gas distributor case to the cells would be non-existent.

For producing the porous electrode layers, a suspension or a slip is prepared from nickel powder with the addition of binding agents, softeners and other auxiliary agents and is drawn out to form a foil. The foil is shaped to form the usable electrode layers in that it is heated, in which case, all organic constituents are expelled up to maximally 450° C. Then sintering takes place between 600° and 1,200° C. in a reducing atmosphere. Frequently, the electrode sintering takes place in a protective atmosphere furnace, and the completely sintered, metallic electrode layers are built into a molten-carbonate fuel cell where, while the temperature and the gas atmosphere are appropriately controlled, they are heated to the operating temperature of the fuel cell so that, because of the effect of the molten lithium-containing electrolyte, a cathode layer is formed from lithiated nickel oxide. By means of the lithiation, that is, by the doping of the nickel oxide with lithium oxide, the cathode is made electrically conductive. In this manner, for example, 2 mol-% of lithium oxide are built into the nickel oxide, which clearly increases its electric conductivity.

Because of its structure, which is a result of the sintered porous nickel layer, the thus produced lithiated nickel-oxide cathode layer has good performance data. However, the nickel oxide dissolves in the molten electrolyte with a saturation concentration of approximately 25 ppm, whereby, during operating conditions, metallic nickel precipitates in the matrix layer close to the anode layer. This normally leads to a failure of the fuel cell because of an internal electric short circuit after approximately 8,000 to 20,000 operating hours. The known lithiated nickel-oxide cathode layer therefore has a limited lifetime which falls further in the operation under increased pressure.

It is also known to use a lithium cobaltite—($LiCoO_2$) powder, or a lithium ferrite—($LiFeO_2$)—powder, which is insoluble in the melting, for the cathode layer. The powders are processed into a foil, graphite being used as a pore forming agent. From the foil, a lithium cobaltite cathode layer or a lithium ferrite cathode layer is sintered and is then built into the fuel cell together with the matrix layer and the anode layer. The cathode layer, which is produced in this oxide ceramic manner, does not have the characteristic fine structure of the nickel oxide cathode formed from a porous nickel layer. It is also extremely brittle which makes the areal current contact to the cathodic current collector plate more difficult.

For producing a lithium ferrite cathode layer of a molten carbonate fuel cell, it is known from German Patent Document DE-OS 40 30 944 A1, to oxidize a sintered carbonyl iron layer and to bring it subsequently in contact with the lithium carbonate of the melting.

German Patent Document DE-OS 30 40 904 A1 describes a cathode layer for a molten-carbonate fuel cell made of lithiated nickel oxide and lithium ferrite which is obtained by the oxidation of a sintered porous foil made essentially of nickel and iron particles in the lithium-carbonate-containing melting of the fuel cell.

It is an object of the invention to provide a process for producing a molten-carbonate fuel cell with a cathode layer which, while its useful life is long, permits high current densities with low excess voltages.

According to the invention, this is achieved by means of the process characterized in claim 1. Advantageous developments of the invention are indicated in the subclaims.

In the process according to the invention, a cathode layer is formed which is virtually insoluble in the molten electrolyte and which guarantees a significantly increased lifetime also in the case of a pressure operation of the fuel cell. In this case, the process according to the invention is designed such that the formed lithium cobaltite or lithium ferrite as the cathode material is structured in such a manner that a fine structure is obtained which is analogous to the nickel-oxide cathodes, resulting in high current densities with low excess voltages. At the same time, by means of the process according to the invention, an areal current contact of the cathode layer with respect to the current collector plates can be achieved.

According to the process of the invention, a lithium cobaltite ($LiCoO_2$) layer or a lithium ferrite ($LiFeO_2$) layer is formed from a ductile cobalt layer or iron electrode layer whose pores are filled with lithium carbonate ($Li_2CO_3$) after the oxidation with an increase in volume. For the conversion to the lithium cobaltite or lithium ferrite layer, the electrode is preferably combined with the matrix layer and the anode layer, the current collector plates and the bipolar plates of the fuel cell and is inserted into the cell holder. This means that the process according to the invention will then represent a special starting procedure of the fuel cell. In this case, the lithium cobaltite or lithium ferrite formation process, because of its increase in volume, stabilizes the establishment of the electric and mechanical connections between the individual components of the fuel cells. In this case, the starting electrode layers made of metallic cobalt or iron are designed to be so porous that the increase in volume during the oxidation to cobalt oxide and iron oxide and the subsequent reaction with lithium carbonate to lithium cobaltite or lithium ferrite causes no densening preventing the substance transport. On the contrary, the fine structure of the lithium cobaltite or lithium ferrite cathode layer is shaped by the fine structure of the highly porous starting electrode layer of metallic cobalt or iron. The sinter necks between the cobalt grains and the iron grains of this starting electrode layer, which are constructed analogously to a porous nickel electrode layer, are found again in a thickened form in the fine structure of the lithium cobaltite or lithium ferrite cathode layer and cause the electrode structure which is advantageous for the polarization resistance.

For producing the starting electrode layer, cobalt powder or iron powder is preferably used which has a median particle size of from 0.5 to 5 µm, particularly carbonyl cobalt or carbonyl iron.

From the cobalt powder or iron powder, a suspension is made by means of an aqueous binding agent, which suspension is also called a slip or may be formed as a pasty mass. The binding agent is an organic binding agent, such as polyvinyl alcohol. The suspension may also contain other auxiliary substances, such as glycerin.

By means of a foil drawing device, according to a pressure process, by means of casting or the like, a foil is produced from the slip and is dried in air. The thickness of the dried foil may, for example, be 0.1 to 2 mm.

The dried foil will then be heated to maximally 450° C. in order to expel all organic constituents. Then it is sintered for approximately 0.5 to 12 hours in a reducing atmosphere to form a highly porous cobalt or iron layer. The sintering of the iron takes place at from 450° to 800° C.; the sintering of the cobalt at from 800° to 1,000° C.

The thus produced, highly porous cobalt or iron layer is then filled with lithium carbonate. The cobalt or iron layer can be filled as such with lithium carbonate—thus separately from the matrix layer and anode layer—or it can be filled after it was combined corresponding to the layer sequence in the fuel cell with the matrix layer and anode layer as well as possibly the remaining constituents of the fuel cells, thus the current collector plates and the polar plates.

The filling of the cobalt layer or iron layer with lithium carbonate may take place by means of a lithium-carbonate foil or lithium-carbonate layer which is arranged on the cobalt layer or iron layer and is then melted. The melting-open of the lithium carbonate takes place in a non-oxidizing, preferably reducing atmosphere at 730° to 760° C. If the cobalt layer or iron layer is filled in the layer arrangement with the matrix and anode layer with lithium carbonate, the lithium carbonate layer is arranged between the cobalt layer or the iron layer, on the one hand, and the matrix layer, on the other hand. The filling will then take place during the starting procedure of the cell after the oxidation of the metal layers to form cobalt oxide layers or iron oxide layers with the simultaneous formation of lithium cobaltite or lithium ferrite.

In addition, it is possible to obtain a cobalt layer or iron layer filled with lithium carbonate by constructing the cathode in two layers. For this purpose, the cobalt or iron layer may be provided on its side facing away from the matrix with a porous nickel layer which was produced, for example, by sintering nickel powder. The porous nickel layer is filled with lithium carbonate. The thickness of the cobalt or iron layer can then be considerably reduced, and may amount to, for example, 0.1 to 0.5 mm, while the nickel layer is thicker; thus, has a thickness of, for example, from 0.5 to 1.5 mm. In this case, the cobalt or iron layer is therefore filled by the melting of the lithium carbonate existing in the nickel layer. In this case, it is possible to replace the lithium carbonate ($LI_2CO_3$) situated in the nickel layer by lithium potassium carbonate which is higher in lithium than corresponding to the molten electrolyte and to thus lower the forming temperature of the lithium cobaltite or lithium ferrite corresponding to the melting point of the carbonate higher in lithium, which melting point is lower in comparison to pure $Li_2CO_3$. This becomes possible because the cobalt oxide or iron oxide formed above 520° C. after changing to the oxidizing cathode gas atmosphere reacts already at 650° C. with the carbonate to form lithium cobaltite or iron ferrite.

The matrix layer consists of a ceramic material, such as lithium aluminate; the anode layer consists, for example, of highly porous nickel which can be produced by sintering nickel powder, optionally with additions.

The cobalt or iron layer filled with the lithium carbonate and combined with the matrix layer and the anode layer is oxidized in the cell to form cobalt oxide and iron oxide. It will then be required to protect the anode layer from oxidation.

This may be achieved, for example, by means of an anode layer filled with the molten electrolyte consisting of lithium carbonate and potassium carbonate, specifically because of the fact that the layer arrangement is heated to the melting temperature of the melting electrolyte. The molten electrolyte is then taken in by the matrix layer, whereby the anode layer is gastightly separated from the cathode layer. The melting of the melting electrolyte takes place at 450° to 520°, specifically in a non-oxidizing, preferably reducing atmosphere. Instead, in order to protect the anode from oxidation, a matrix made of two layers may also be used, in which case a molten electrolyte layer is arranged between the two matrix layers of the layer arrangement.

Graphite may be added as a pore forming agent to the suspension for producing the cobalt or iron layer. The graphite preferably has a median particle size of from 10 to 40 µm, in which case an amount of from 10 to 30% by weight relative to the weight of the cobalt or the iron may be present in the suspension. For forming the pores, the graphite is burnt.

The burning of the graphite may take place after the sintering of the cobalt or iron layer and therefore before the filling of this layer with lithium carbonate. For this purpose, after the sintering, the cobalt or iron layer is subjected for a short time to an oxidizing atmosphere at a temperature of from 600° to 990° C.

Irrespective of whether the cobalt or iron layer contains graphite, when the anode was protected against oxidation, the cobalt or iron is oxidized to form cobalt oxide or iron oxide, for example, in air. For this purpose, the cobalt or iron layer is heated to a temperature of maximally 680°, without any melting of the lithium carbonate present in the pores of the cobalt or iron layer. The oxidation time is generally 2 to 12 hours.

Subsequently, the reaction takes place of the cobalt oxide or iron oxide with the lithium carbonate present in the pores of the layer forming lithium cobaltite or lithium ferrite. The reaction takes place above the melting temperature of the lithium carbonate, preferably at approximately 730° C.

The following examples are used for further explaining the invention.

EXAMPLE 1

Green foils produced by means of a foil drawing apparatus are used as the starting components for a nickel anode layer, a lithium aluminate matrix layer and a cobalt layer from which the cathode is produced. In this case, the cathode foil was produced by using carbonyl cobalt and graphite powder. The matrix foil is used directly. The anode foil is sintered in a reducing manner at approximately 800° C. and is saturated at approximately 550° with the molten electrolyte which will solidify in the pores of the anode foil during cooling. The cathode foil is sintered in a reducing manner at approximately 900° C., whereupon, at approximately 700° C., by means of a short-term effect of an oxidizing furnace atmosphere, the graphite powder used as the pore forming agent is burnt out. After the cooling, the pores of the cobalt foil are filled with lithium carbonate at approximately 750° C. in a second heating process carried out in a reducing manner.

In the sequence nickel anode, matrix and cobalt layer, the three foils are arranged between the respective current collector plates, and these individual cell bundles are built together with the bipolar plates to form the fuel cell. The fuel cell is then heated to approximately 520° C., in which case the anode layer and the cobalt layer are rinsed with nitrogen containing 2% hydrogen. Starting at approximately 490° C., the matrix layer takes in the molten electrolyte situated in the anode layer and therefore seals the anode space off from the cathode space of the fuel cell. The cathode space of the fuel then is then rinsed with air, in which case the cobalt grains of the cathode layer are oxidized to form cobalt oxide without clearly changing its fine structure. In this case, the fuel cell is heated from 520° C. to 680° C., without any melting of the lithium carbonate in the pores.

Then the temperature is raised to approximately 730° C. in order to melt the lithium carbonate in the pores of the cobalt oxide layer. From the molten lithium carbonate and the cobalt oxide ($Co_3O_4$) grains, a lithium cobaltite cathode layer is formed with an increase in volume. The increase in volume also causes a slight expansion of the thickness which connects the cathode layer, the matrix layer, the anode layer and the current collector plates with one another because of the resulting mechanical pressure.

A microscopic picture of the thus produced lithium cobaltite cathode layer is enclosed.

EXAMPLE 2

In the case of fuel cells with an internal gas distribution, a shrinking of the layer arrangement during the starting operation may be accepted and therefore a layer combination with a lithium carbonate intermediate layer may be used. The layer construction of several fuel cells will then consist of a multiple of the following combinations:

Bipolar plate current collector plate cobalt/graphite layer lithium carbonate layer matrix layer lithium potassium carbonate layer matrix layer nickel anode layer current collector plate bipolar plate Thus, the porous cobalt/graphite layer is filled by the lithium carbonate of the adjacent lithium carbonate layer. Previously, the burning-out of the graphite has taken place during the oxidation of the cobalt to cobalt oxide. The sealing-off of the anode space from the cathode space during the oxidation of the cobalt oxide takes place by the taking-in of the molten lithium potassium carbonate layer between the two matrix layers by these matrix layers above 490° C. Otherwise, this example corresponds to Example 1.

EXAMPLE 3

Several fuel cells with the following layer structure are combined:

Bipolar plate current collector plate nickel layer, saturated with lithium carbonate cobalt/graphite layer matrix layer nickel anode layer, saturated with molten electrolyte current collector plate bipolar plate The nickel layer has a thickness of 0.8 mm, and the cobalt/graphite layer has a thickness of 0.2 mm. Therefore, in contrast to Example 1, and as in Example 2, also in this example, the graphite is not yet burnt. Furthermore, also on the side of the thin cobalt/graphite layer facing away from the matrix layer, a nickel layer is provided which is saturated with lithium carbonate and which is used for saturating the cobalt layer oxidized to cobalt oxide with lithium carbonate.

In this case, it is possible to replace the lithium carbonate present in the nickel layer by a lithium potassium carbonate which is higher in lithium and thus to lower the forming temperature of the lithium cobaltite corresponding to the lower melting point of the lithium potassium carbonate which is high in lithium. This becomes possible because the cobalt oxide formed at above 520° C. after the change-over to the oxidizing cathode gas atmosphere reacts with the high-lithium lithium potassium carbonate starting at 650° C. with a sufficient speed to form lithium cobaltite. The same applies to iron oxide and lithium ferrite. In this case, "lithium potassium carbonate high in lithium" is a lithium potassium carbonate which contains more lithium carbonate than corresponding to the mixture of 62 mol% $Li_2CO_3$ and 38 mol% $K_2CO_3$ which melts at 490° C.

What is claimed is:

1. Process for producing a molten-carbonate fuel cell from a matrix layer which is saturated with a lithium carbonate containing molten electrolyte and which is provided on one side with a porous anode layer and on the other side with a porous cathode layer made of a material selected from the group consisting of lithium cobaltite and lithium ferrite, said process comprising the steps of:

forming the cathode layer by filling a porous matrix layer with pure lithium carbonate, said matrix layer being made from a material selected from the group consisting of cobalt and iron;

oxidizing the matrix layer filled with lithium carbonate in an oxidizing atmosphere to form an oxide layer filled with lithium carbonate at a temperature below the melting point of the lithium carbonate; and raising the temperature above the melting point of the lithium carbonate and reacting the cobalt oxide or iron oxide with lithium carbonate to lithium cobaltite or lithium ferrite.

2. Process, according to claim 1, wherein oxidation of the matrix layer takes place in a temperature range from 520° to 680° C.

3. Process according to claim 1, wherein the reaction of the oxide layer takes place at a temperature of approximately 650° to 730° C.

4. Process according to claim 1, wherein the porous matrix layer is formed from a suspension of fine-powdered cobalt or iron in a liquid binding agent, by the steps of:

processing the suspension to form a foil; and sintering the foil in a reducing atmosphere.

5. Process according to claim 4, wherein the binding agent is separated out of the foil before the sintering by raising the temperature to maximally 450° C.

6. Process according to claim 4, wherein powdery graphite is admixed to the suspension and is oxidized after the sintering.

7. Process according to claim 6, wherein the fraction of the graphite in the suspension, relative to the weight of the cobalt or iron, is within a range of from 10 to 30% by weight.

8. Process according to claim 6, wherein said powdery graphite has a median particle size of from 10 to 40 μm.

9. Process according to claim 6, wherein the graphite is burnt before the cobalt or iron layer is filled with lithium carbonate.

10. Process according to claim 6, wherein the graphite is burnt after the filling of the cobalt or iron layer with lithium carbonate.

11. Process according to claim 1, wherein the cobalt or iron layer before the oxidation to form the cobalt oxide or iron layer is combined with the matrix layer and the anode layer to form a layer arrangement corresponding to a desired layer arrangement of said fuel cell.

12. Process according to claim 11, wherein the porous cobalt or iron layer is first filled with lithium carbonate and is then combined with the matrix layer and the anode layer to form the layer arrangement.

13. Process according to claim 11, wherein in said layer arrangement, an intermediate layer of lithium carbonate is arranged between the cobalt or iron layer and the matrix layer, the lithium carbonate intermediate layer for filling the cobalt or iron layer with lithium carbonate being melted before the oxidation of the cobalt or iron layer to form the cobalt oxide or iron oxide layer.

14. Process according to claim 12, wherein the anode layer is filled with a molten electrolyte before the layer arrangement is formed.

15. Process according to claim 12, wherein the matrix layer consists of two layers, with an intermediate layer of the molten electrolyte arranged between the two layers of the matrix layer.

16. Process according to claim 14, wherein the melting electrolyte is melted before the oxidation of the cobalt or iron layer to the cobalt oxide or iron oxide layer.

17. Process according to claim 16, wherein the melting of the melting electrolyte takes placed in a reducing atmosphere.

18. Process according to claim 1, wherein on a side of the cobalt or iron layer facing away from the matrix layer, the layer arrangement is provided with a porous nickel layer filled with a material selected from the group consisting of lithium carbonate and a lithium-rich lithium potassium carbonate, said material being melted after the oxidation of the cobalt or iron layer and in the process the nickel layer being oxidized to form a nickel oxide layer.

19. Process according to claim 18, wherein said nickel layer has a thickness which is greater-than a thickness of the cobalt or iron layer.

* * * * *